Feb. 19, 1924. 1,484,301
C. B. FUNK
TRANSMISSION CONTROL
Filed Oct. 22, 1920 5 Sheets-Sheet 2
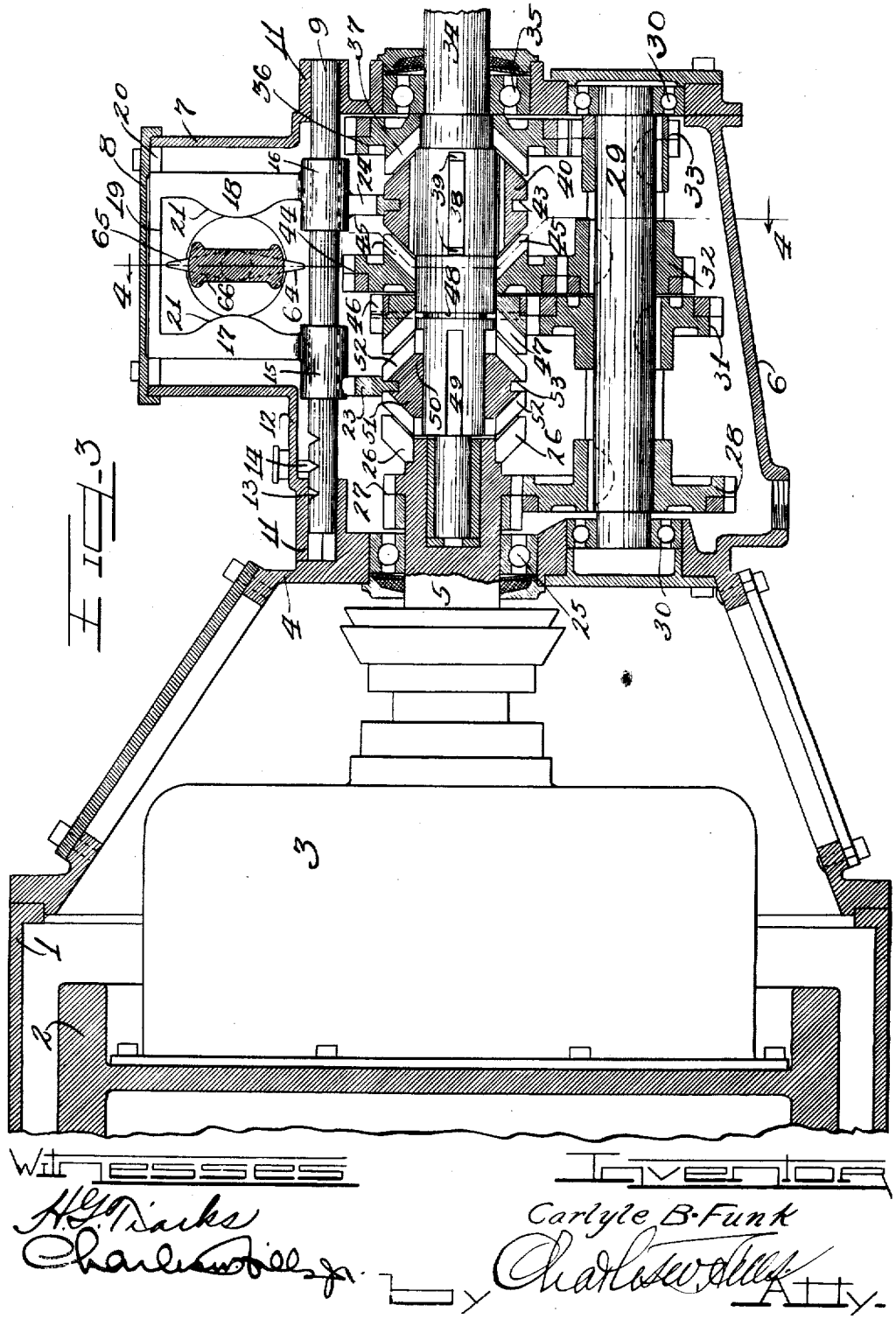

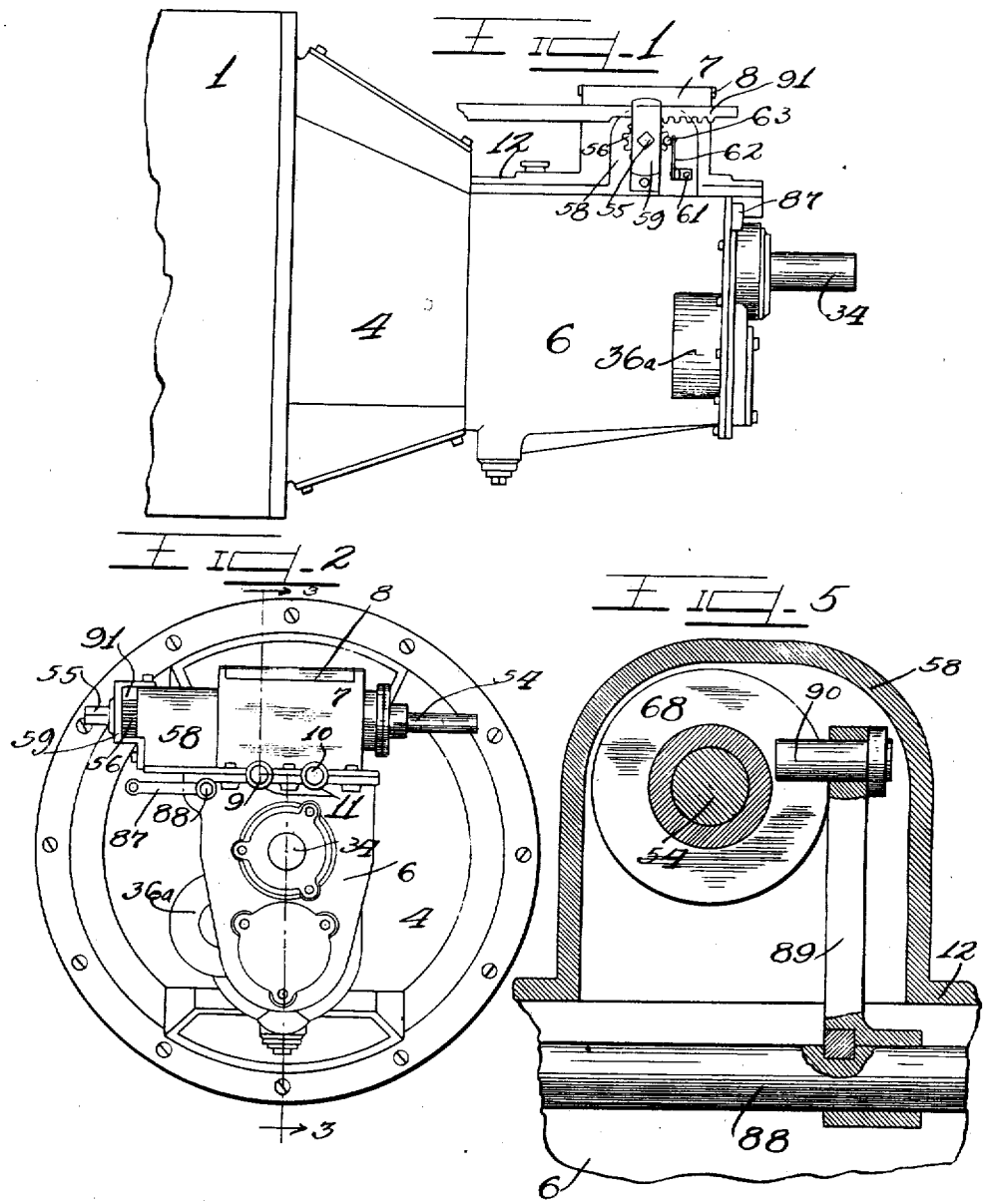

Feb. 19, 1924. 1,484,301
C. B. FUNK
TRANSMISSION CONTROL
Filed Oct. 22, 1920 5 Sheets-Sheet 3
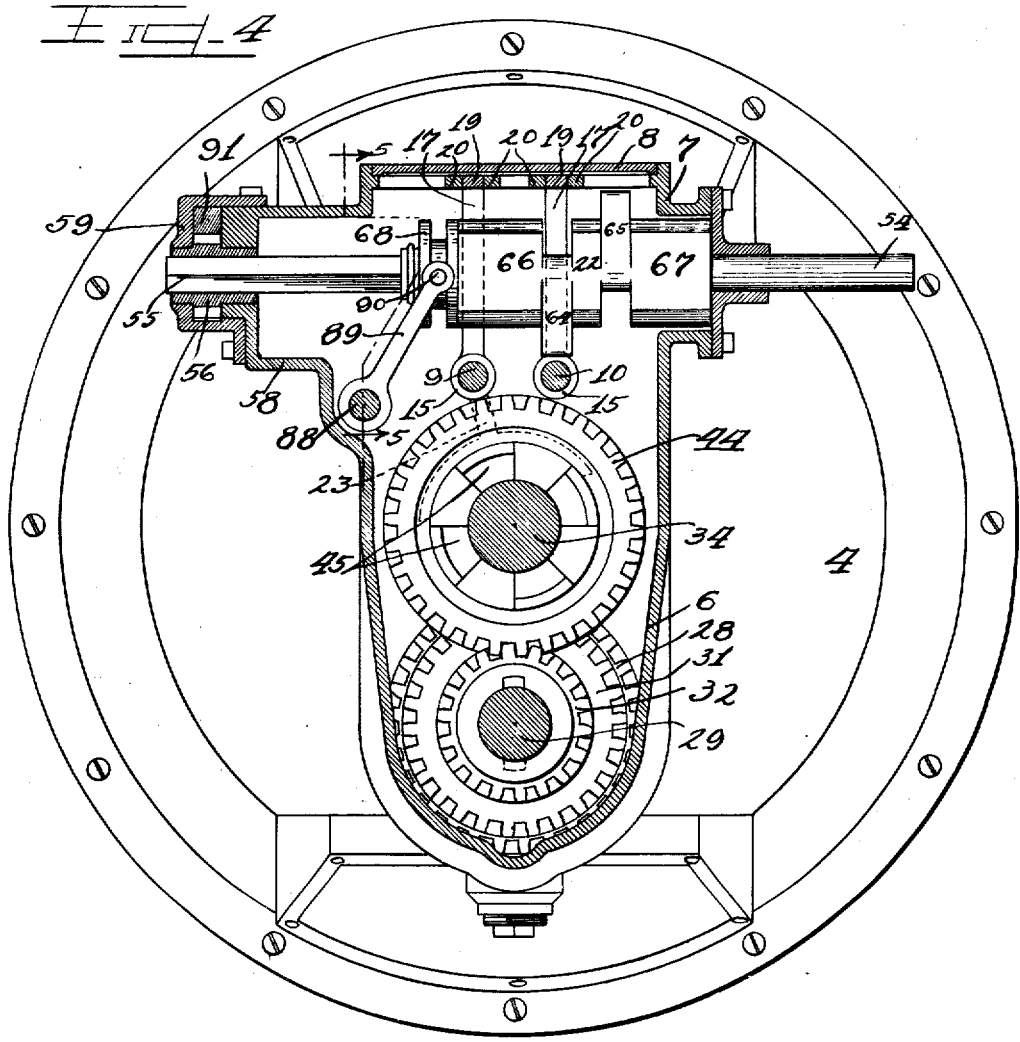
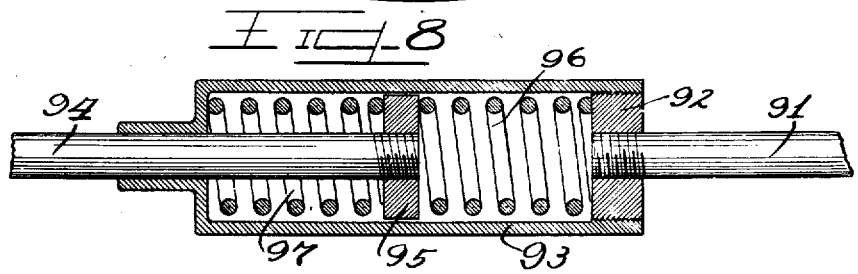
Witnesses Inventor
Carlyle B. Funk.
by Charles O. Tillu Atty.

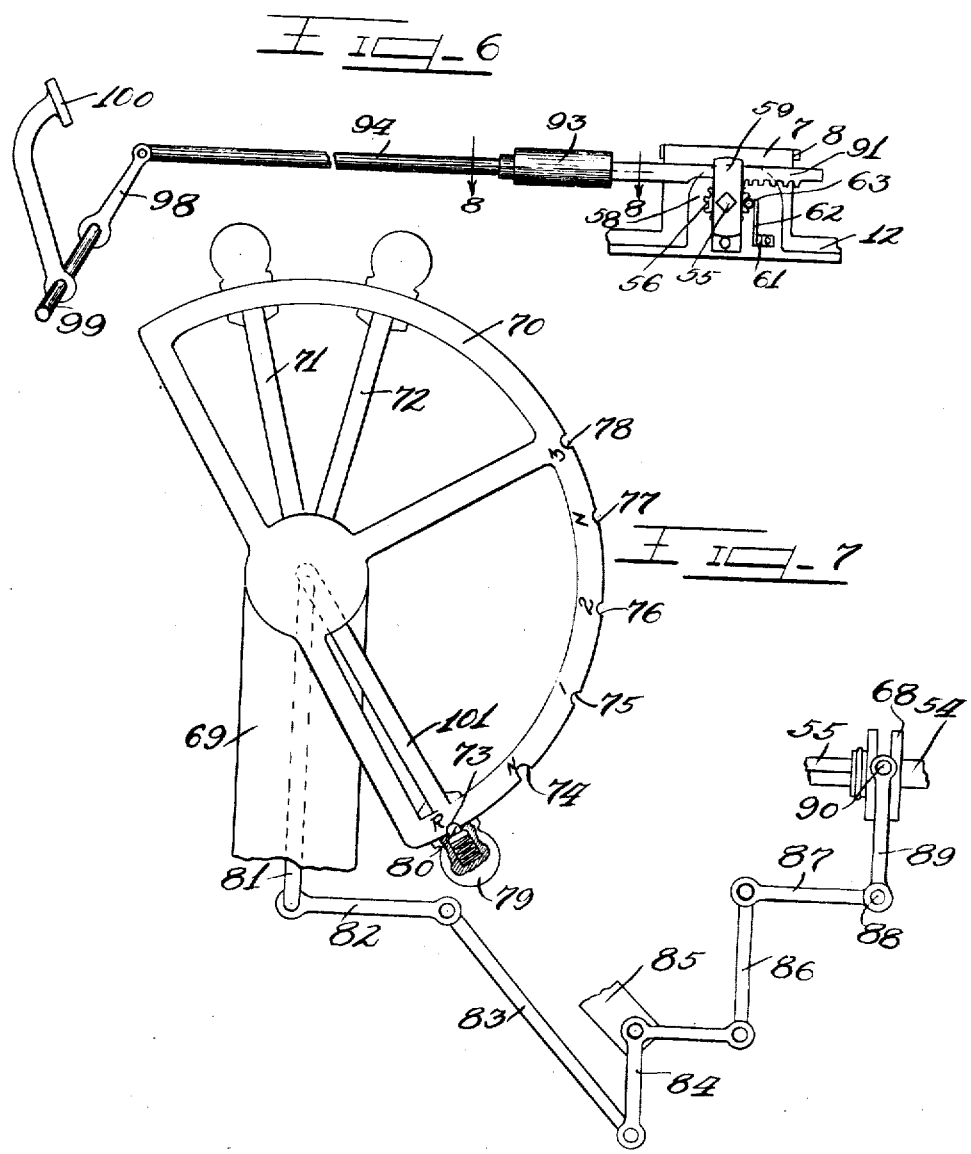

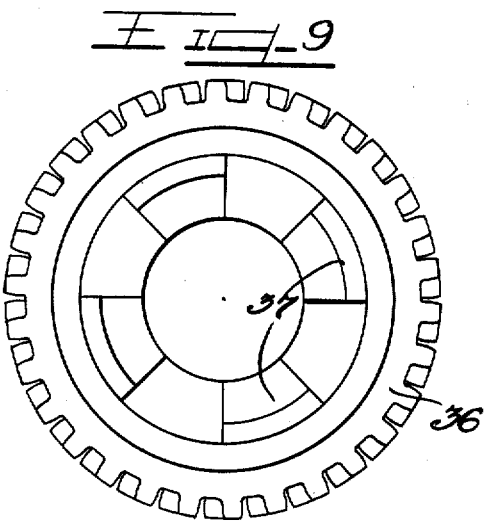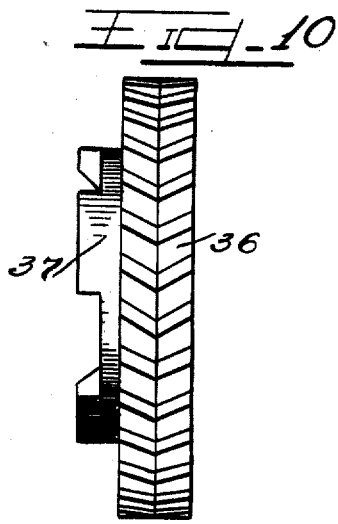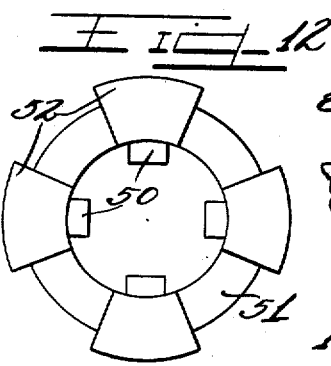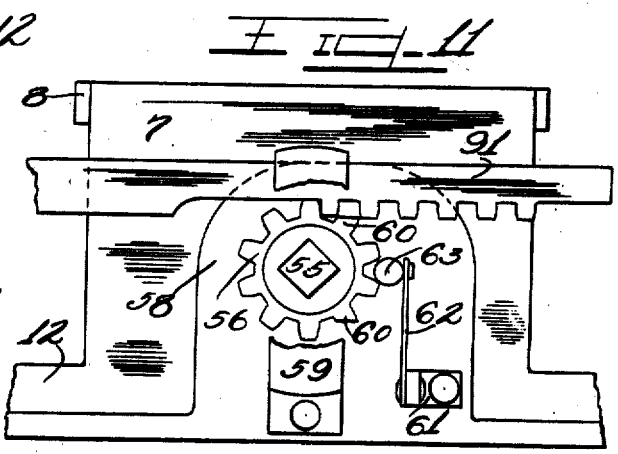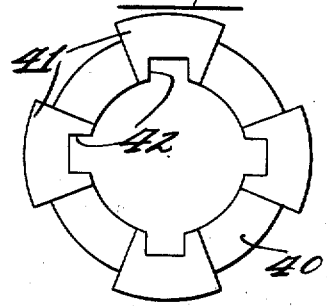

Patented Feb. 19, 1924.

1,484,301

UNITED STATES PATENT OFFICE.

CARLYLE B. FUNK, OF CHICAGO, ILLINOIS.

TRANSMISSION CONTROL.

Application filed October 22, 1920. Serial No. 418,649.

*To all whom it may concern:*

Be it known that I, CARLYLE B. FUNK, a citizen of the United States, and a resident of the city of Chicago, in the county of Cook and State of Illinois, have invented certain new and useful Improvements in a Transmission Control; and I do hereby declare that the following is a full, clear, and exact description of the same, reference being had to the accompanying drawings, and to the numerals of reference marked thereon, which form a part of this specification.

This invention relates more particularly to an improved type of vehicle transmission control mechanism wherein the speed change gears of a transmission are set by means of a control lever on the steering wheel sector for positive actuation by a clutch pedal.

It is an object of this invention to provide a transmission control wherein non-shiftable herringbone gears which normally idle on the mainshaft are adapted to be locked to the mainshaft for co-action with herringbone gears secured on the transmission countershaft by operation of an adjustable cam shaft mechanism.

Another object of the invention is the construction of a transmission control wherein non-shifting intermeshing herringbone gears on a transmission mainshaft and countershaft are adapted to be selectively connected in operating relation by means of shiftable clutch collars operable by a shiftable and rotatable cam shaft mechanism.

It is also an object of this invention to provide a transmission control mechanism wherein a cam shaft is first adapted to be slidably set by a steering wheel lever with respect to a transmission mechanism and then rotated by operating a clutch pedal to cause a selective adjustment of the transmission.

A further object of the invention is to provide a transmission having a cam shaft adapted to be shifted to effect a desired speed change when a clutch pedal is actuated.

It is furthermore an object of this invention to provide a transmission control wherein a cam shaft is adapted to be set by operating a control arm on the steering wheel of a vehicle whereby operation of a clutch pedal acts to rotate the cam shaft in its adjusted position and thereby cause the same to shift one of the transmission rods to move a collar on the transmission main shaft into locking engagement with a main shaft gear which meshes at all times with a gear secured on the transmission countershaft.

It is a further object of this invention to construct a positively acting transmission control the shifting forks of which are cam actuated to shift clutch collars into locking engagement with a clutch on a clutch shaft or into locking engagement with the clutch teeth of non-shiftable gear mechanisms to effect speed changes.

It is an important object of this invention to provide a transmission control having a cam shaft adjustably mounted above a transmission, said cam shaft having formed thereon a plurality of neutralizing cams separated by positively acting cams whereby any desired speed change adjustment of the transmission may be obtained by first setting the cam shaft and then rotating the same to operate the transmission.

Another important object of the invention is to provide a transmission control device wherein a cam shaft is positioned to co-act with cam frames on transmission shifter rods to cause a selective operation of the transmission to take place when the cam shaft is set by operation of a steering wheel lever and by depression of a clutch pedal.

Other and further important objects of this invention will be apparent from the disclosures in the specification and the accompanying drawings.

The invention (in a preferred form) is illustrated in the drawings and hereinafter more fully described.

On the drawings:

Figure 1 is a side elevation of a transmission device embodying the principles of this invention.

Figure 2 is an end view thereof.

Figure 3 is an enlarged longitudinal section taken on line 3—3 of Figure 2 showing parts in elevation.

Figure 4 is an enlarged transverse section taken on line 4—4 of Figure 3, with parts in elevation.

Figure 5 is an enlarged fragmentary detail section taken on line 5—5 of Figure 4 with parts in elevation.

Figure 6 is a side elevation of the mechanism connecting the brake pedal with the cam shaft.

Figure 7 is a developed plan of the transmission control mechanism for setting the cam shaft.

Figure 8 is an enlarged detailed section taken on line 8—8 of Figure 6 with parts in elevation.

Figure 9 is an enlarged front view of one of the mainshaft herringbone clutch gears.

Figure 10 is a side view thereof.

Figure 11 is an enlarged side elevation partly broken away of the rack and gear mechanism for operating the cam shaft.

Figure 12 is an enlarged end view of one of the mainshaft shifter collars.

Figure 13 is an enlarged end view of another of the mainshaft shifter collars.

As shown on the drawings:

The reference numeral 1 indicates an automobile flywheel casing having a flywheel 2 mounted therein. Connected to co-act with the flywheel 2 is a clutch 3 enclosed by a housing 4. Projecting through the end of the clutch housing 4 is a clutch shaft 5 which projects into a transmission case or housing 6 formed on the end of the clutch housing. Formed on the cover or top 12 of the transmission casing 6 is a box or hood 7 provided with a removable cover 8.

The improved transmission and the control means for operating the same is clearly illustrated in Figures 3 and 4 and comprises two parallel shifter rods 9 and 10 which are slidably mounted in guide sleeves 11 of the transmission case 6. Each of the shifter rods 9 and 10 is provided near one end with a plurality of notches 13 to permit spring controlled pins 14 to releasably engage therein to hold the shifter rods 9 and 10 set in their adjusted positions against accidental shifting. Secured on each of the shifter rods 9 and 10 are the two spaced sleeves 15 and 16 of a frame or yoke embracing upright arms 17 and 18 connected at the top by a cross beam 19. The shift frames are disposed to slide in guide grooves provided between guide strips 20 secured on the inner surface of the box cover 8. Each of the shifter frame arms 17 and 18 are shaped to afford curved projections or cams 21 on the inner edges thereof. Rigidly secured on the bottom of the sleeve 15 of one of the shifter frames is a shifter fork 23, while the sleeve 16 of the other shifter frame has a similarly constructed shifter fork 24 secured on the bottom thereof.

The clutch shaft 5 is supported by a ball bearing 25 mounted in the front wall of the transmission casing 6. Integrally formed or rigidly secured on the rear end of the clutch shaft, within the transmission casing, are a plurality of tapered inclined clutch teeth 26. Formed on the clutch shaft 5 between the ball bearing 25 and the cultch teeth 26 is a clutch shaft gear or main drive herringobne gear 27 which meshes with a countershaft drive herringbone gear 28. The herringbone gear 28 is keyed near the front end of a transmission countershaft 29. The ends of the countershaft are supported by ball bearings 30 mounted in the end walls of the transmission casing 6. Also keyed upon the countershaft 29 is a second or intermediate speed herringbone gear 31, a first or low speed herringbone gear 32 and a reverse herringbone gear 33. The herringbone gears 28, 31, 32 and 33 are of different sizes, gear 28 being the largest and gear 33 the smallest.

Mounted within the transmission casing 6 above and parallel to the countershaft 29 is a transmission mainshaft 34 the rear end of which is supported by a ball bearing 35 and projects outwardly through the rear wall of the transmission casing for connection with the automobile propeller or drive shaft. The front end of the transmission mainshaft 34 is of reduced diameter and is journalled within the rear end of the clutch shaft 5. Rotatably mounted on the mainshaft 34 adjacent the ball bearing 35 is a compound or combination clutch gear comprising a reverse herringbone gear 36 having tapered or cone shaped clutch teeth or dogs 37 integrally formed at an angle on one side thereof. The reverse herringbone gear 36 is in mesh with a reverse idler herringbone gear, not shown but engaged on an idler shaft mounted within an idler gear housing 36ᵃ. The reverse idler herringbone gear is also in mesh with the mainshaft reverse herringbone gear 33. Rigidly secured in longitudinal grooves in the mainshaft 34 are a plurality of splines or keys 38 which project outwardly and have the ends thereof chamfered or beveled as at 39. Slidably engaged on the main shaft 34 and fitting over the splines 38 is a low and reverse collar 40 provided at each end with integral tapered clutch teeth or dogs 41 each having a groove 42 therein adapted to slidably engage over one of the mainshaft splines 38. The low and reverse collar 40 is also provided with a peripheral groove 43 to receive the shifter fork 24. Rotatably mounted on the main shaft 34 adjacent the low and reverse collar 40 is a compound or combination clutch gear embracing a low speed herringbone gear 44 having tapered or cone shaped clutch teeth or dogs 45 integrally formed on one side thereof similar to the construction illustrated in Figures 9 and 10. The low speed herringbone gear 44 is in mesh with the low speed herringbone gear 32 at all times and is thus held from shifting axially on the main shaft 34. Also rotatably engaged on the transmission main shaft 34 adjacent the low speed herringbone gear 44 is a smaller compound or combination clutch gear comprising a second or intermediate speed herringbone gear 46 having tapered inclined clutch teeth or dogs 47 integrally formed on one side thereof similar to the construction shown in Figures 9 and 10. A peripheral groove 48 is provided in the main schaft 34 to receive the inner ends of pins forming a part of the gear 47 as illustrated in Figure 3. The three herringbone gears 36, 44 and 46 normally idle on the transmission main shaft. The herringbone gear 46 meshes at all times with the herringbone gear 31 and is prevented from sliding axially on the main shaft 34. Also provided in the transmission main shaft 34 are a plurality of longitudinal grooves or slots 49 open at one end to permit the lugs or splines 50 of a high and intermediate speed shifter collar 51 to slidably engage therein. The collar 51 has integrally formed on each end thereof a plurality of tapered inclined clutch teeth or dogs 52. A peripheral groove 53 is provided in the collar 51 to receive the shifter fork 23 as illustrated in Figure 3.

As shown in Figures 3 and 4 a cam shaft 54 is slidably supported in the box 7 transversely above the shifter rods 9 and 10. One end of the cam shaft 54 is squared as at 55 and slidably projects through a squared opening in a pinion or gear 56. The pinion 56 is provided with hubs which are journalled in the end wall 57 of the box extension 58 and in a metal strap 59 secured to the end of the box extension 58 to hold the pinion 56 in place. The pinion 56 is provided with two mutilated teeth 60 as illustrated in Figure 11. Mounted on the exterior of the end wall of the box extension 58 is a bracket 61 to which the lower end of a resilient arm or plate spring 62 is attached. Secured to the upper end of the spring 62 is a ball 63 adapted to co-act with the mutilated pinion 56. Integrally formed or rigidly secured on the shaft 54 are two main or positively acting operating cams 64 and 65 directed in opposite directions and separated by an intermediate neutralizing cam 22. Also integrally formed on the shaft 54 and integral with the operating cam 64 is a primary neutralizing cam 66 which projects equally on opposite sides of said shaft 54. A secondary neutralizing cam 67 is integrally formed on the shaft 54 adjacent and integral with the operating cam 65. The secondary neutralizing cam 67 is shorter than the primary neutralizing cam 66 and also projects equally on opposite sides of the shaft 54. Rigidly secured on the shaft 54 adjacent the neutralizing cam 66 is a peripherally grooved collar or ring 68 which is adapted to permit slidable adjustment of the cam shaft with respect to the shifter frames 17—19 on the rods 9 and 10.

The setting or the adjustment of the cam shaft 54 is controlled by a control mechanism operable from the steering wheel of the automobile. Referring to Figure 7 the reference numeral 69 indicates an automobile steering wheel column on the upper end of which is rigidly secured a sector 70 having a spark lever 71 and a throttle lever 72 adjustably associated therewith. The steering wheel sector 70 is provided with spaced notches 73, 74, 75, 76, 77 and 78 respectively labelled R, N, 1, 2, N and 3 indicating reverse, neutral, first speed, second speed, neutral and third speed. A control lever 101 is mounted to co-act with the notched sector 70. The head 79 of the control lever 101 is provided with a spring impelled pin 80 adapted to engage in the sector notches when the control level 101 is actuated to set the cam shaft. The control lever has the inner end thereof rigidly secured on the upper end of a stem or rod 81 which is rotatably mounted within the steering wheel column 69. Rigidly connected to the lower end of the stem 81 is one end of an arm 82 to the other end of which is pivotally connected one end of a connecting link 83. The other end of the connecting link 83 is pivotally connected to the outer end of one of the arms of a bell-crank 84. The bell-crank 84 is pivotally supported at the angle portion thereof on a stationary support 85 of the automobile frame. Pivotally attached to the end of the second arm of the bell-crank 84 is one end of a connecting link 86 the other end of which is pivotally connected to one end of an arm 87. The other end of the arm 87 is rigidly secured on the outer projecting end of a shaft 88 which is journalled in suitable bearings within the transmission case 6. Keyed or otherwise secured on the shaft 88 within the transmission case 6 is the lower end of a cam shaft shifter lever 89 the upper end of which projects into the box extension 58 and has a pin or roller 90 supported thereon to project into the groove of the shifter ring 68 of the cam shaft.

Referring now to Figures 1, 6, 8 and 11 of the drawings, an operating mechanism is illustrated for rotatably operating the cam shaft to cause operation of the transmission shifter rods for a selected or set position of adjustment of said cam shaft. The operating mechanism comprises an adjustable rack 91 which projects between the strap 59 and the end wall of the box extension 58 so that the rack teeth mesh with the teeth of the pinion 56. The rack 91 has one end thereof securely connected with an end wall or plate 92 which is removably threaded into an internally threaded end of a tube or cylinder 93. Slidably projecting through an opening in the closed end of the cylinder 93 is an actuating shaft or tie rod 94. A plunger or piston 95 is secured on the end of the actuating rod 94 within the cylinder 93. Disposed within the cylinder 93 between the plunger 95 and the removable cylinder end plate 92 is a coiled spring 96. Another coiled spring 97 is disposed within the cylinder 93 between the closed end of said cylinder and the plunger 95. The forward end of the actuating rod 94 is pivotally connected to the upper end of a lever or arm 98 the other end of which is keyed or otherwise secured on a clutch pedal shaft or rod 99. Secured to the rod 99 is a clutch foot pedal 100.

The operation is as follows:

This invention covers an improved vehicle transmission control wherein the ordinary gear shift lever is replaced by an adjustable cam shaft mechanism adapted to be selectively set from the vehicle steering wheel sector to effect a selective operation of the transmission by depressing a clutch pedal.

With the control lever 101 positioned in the position shown in Figure 7 the control lever pin 80 engages in the sector notch 73. This is the reverse position of the control lever and the connections between said control lever 101 and the shifter ring 68 act to hold the cam shaft 54 in its reverse position as illustrated in Figure 4. In this the reverse position of the cam shaft a depression of the clutch pedal 100 will merely cause the rack 91 and the pinion 56 to rotate the cam shaft 54 through one hundred and eighty degrees thereby also rotating the positively acting cam 64 upwardly against the cam 21 on the upright 18 of the shifter frame on rod 10. This operation acts to move or shift the shifter rod 10 and its respective frame into reverse position. As shown in Figure 3 the spring impelled pins 14 act to hold the shifter rods in their adjusted positions against accidental shifting but do not prevent a positive operation when the control lever 101 is operated.

To effect a desired selective operation of the transmission the operator of the automobile simply moves the control lever 101 on the sector 70 to permit the control lever pin 80 to engage in the sector notch corresponding with the transmission adjustment desired. For example to effect a low or first speed transmission the control lever is moved to permit the pin 80 to engage in the sector notch 75 marked "1". This operation of the control lever 101 causes the connecting members 81—88 to swing the lever 89 so that the pin or roller 90 will act to slide or shift the cam shaft 54 outwardly into the desired selected position wherein the positive acting cam 65 will lie in the plane of the upright shifter frame of the shifter rod 10. The cam shaft is thus set in the desired position. The clutch pedal 100 is now depressed to swing the lever arm 98 forwardly thereby drawing the tie rod 94 and the rack 91 forwardly with the double acting spring set 93 serving to give resilience in the locking operation of the transmission. Movement of the rack 91 forwardly rotates the pinion 56 and thus rotates the cam shaft 54 one hundred and eighty degrees. This rotation of the cam shaft causes the cam 65 to act downwardly against the inner edge or cam 21 of the frame arm 17 on the shifter rod 10 thereby shifting the frame and its shifter rod 10 forwardly. The shifter fork 24 accordingly slides the clutch collar 40 forwardly into locking engagement with the dog teeth 45 of the low speed herringbone gear 44 thereby locking said gear 44 to the main shaft 34. A low drive is thus transmitted from the clutch shaft main driving gear 27 to the countershaft driving gear 28, then to the main shaft 34 through the countershaft low speed gear 32 and the main shaft low speed gear 44 meshing therewith and locked to the mainshaft by the clutch collar 40. Release of the clutch pedal reverses the rotation of the cam shaft to its original or starting position. Any desired adjustment of the transmission may thus be effected by merely setting the control lever 101 and depressing the clutch pedal.

By referring to Figure 11 it will be noted that the two teeth 60 of the gear 56 are mutilated or cut off to permit the rack 91 to travel out of engagement with the gear teeth and thus allow for slack motion. Through this slack motion an interval is obtained in which the clutch 4 is operated before the transmission gear lock movement takes place. The mutilated gear arrangement also provides slack at the end of the rack stroke.

Accidental shifting of the shifter rods 9 and 10 is prevented by the spring impelled pins 14 which co-act with the notches 13 provided in the shifter rods. The spring supported ball 63 is adapted to be held in coacting relation with the gear 56 to prevent accidental rotation of the cam shaft 55.

The sides of the neutralizing cams 22, 66 and 67 are formed to permit the same to clear the cams 21 on the upright members 17 and 18 of the shifter frames when the cam shaft is moved from one position of adjustment to another.

The shiftable cam shaft 54 is so constructed that desired speed changes and reversing are obtained by the positively acting cams 64 and 65 co-acting with the frames on the shifter rods 9 and 10. The neutralizing cams 66, 67 and 22 of the cam shaft are adapted when in normal position to positively retain or move the shifter rods into neutral position when the clutch pedal is operated. The secondary neutralizing cam 67 is brought into operation to return the shifter rod 10 and its frame to neutral position before a change from reverse or low speed to either second or high speed is effected. The primary neutralizing cam 66 is used to positively return the shifter rod 9 and its frame to neutral position before a change from second or high speed to either low or reverse is effected. When the control lever is shifted to co-act with the sector notch 74 the cam shaft is adjusted to position the intermediate neutralizing cam 22 in the plane of the shifter frame on the shifter rod 10 thereby also positioning the primary neutralizing cam 66 to co-act with the shifter frame on the shifter rod 9 so that if the clutch pedal is operated both of the shifter rods will be moved into neutral position from any position of adjustment they may happen to be in. If the control lever is moved to co-act with the neutral notch 77 on the sector the cam shaft is shifted into a position wherein the intermediate neutralizing cam 22 is disposed in the plane of the shifter frame on the shifter rod 9 while the secondary neutralizing cam 67 is positioned to co-act with the shifter frame on the shifter rod 10 so that if the clutch pedal is operated both of the shifter rods will be moved into neutral position from any position of adjustment they may be in. It will thus be seen that the shifter rods and their frames are always returned to or moved through neutral before a change from one speed to another is effected.

Attention is directed to the steering wheel sector 70 of Figure 7 which shows the neutral notch 74 considerably deeper than the remaining sector notches. This arrangement is provided for the purpose of positively insuring the operator the exact position of the control lever 101, when the sector 70 cannot be properly seen as for instance at night.

When the lever 101 is moved over the sector an operator can tell by the feeling that the cam shaft is set for neutral when the latch pin 80 springs into engagement with the deep notch 74.

The novel arrangement of the three neutralizing cams with respect to the positively acting cams affords a cam shaft the operation or adjustment of which by the operation of the control lever is fool proof, that is, it is such that the cam shaft will positively be moved into the desired position of adjustment from or through neutral in both directions of movement of the control lever 101 over the sector 70.

The employment of intermeshing herringbone gears on the transmission mainshaft and countershaft prevents longitudinal shifting of said gears, and therefore the use of herringbone gears is not possible in transmission systems at present in use.

The clutch teeth of the speed change collars and gears on the transmission mainshaft are of tapered or cone shaped form in order to reduce the noise when the speeds of rotation of the clutch collars and the clutch gears when brought together are very different.

Attention is also called to the fact that the cone shaped teeth being inclined at an angle of forty-five degrees save in space since the tooth spaces run into the gear blanks thereby permitting the width or length of the speed change collars and gears to be reduced to a minimum.

I am aware that numerous details of construction may be varied through a wide range without departing from the principles of this invention, and I therefore do not purpose limiting the patent granted otherwise than necessitated by the prior art.

I claim as my invention:

1. The combination with a transmission, of a mechanism for effecting an adjustment of the transmission, a pinion engaged on said mechanism, spring controlled means engaging said pinion to hold the same against accidental rotation, a rack in mesh with said pinion, a tie rod, a double spring set connecting said rack and tie rod, a lever connected to said tie rod, and a foot pedal for operating said lever to effect rotation of said mechanism and adjustment of the transmission.

2. A transmission device comprising a casing, speed change mechanisms therein, shifter rods in said casing, shifter members thereon for co-action with said speed change mechanisms, a housing on said casing enclosing said shifter members, a pinion supported thereon, a shaft journalled in said housing and projecting through said pinion, a plurality of cams formed on said shaft, means for adjustably shifting said shaft for selectively setting said cams with respect to said shifter members, and means for rotating said pinion and said shaft to cause the selected cams to co-act with said shifter members to effect a selective operation of the speed change mechanisms.

In testimony whereof I have hereunto subscribed my name in the presence of two subscribing witnesses:

CARLYLE B. FUNK.

Witnesses:
FRED E. PAESLER,
EARL M. HARDINE.